United States Patent [19]

Bollinger et al.

[11] Patent Number: 4,588,872

[45] Date of Patent: May 13, 1986

[54] SELF-GUIDED WELDING MACHINE

[76] Inventors: John G. Bollinger, 6117 S. Highlands Ave., Madison, Wis. 53711; John J. Zik, 3565 Tienken Rd., Rochester, Mich. 48063; Neil A. Duffie, 5305 S. Hill Dr., Madison, Wis. 53705

[21] Appl. No.: 592,512

[22] Filed: Mar. 22, 1984

[51] Int. Cl.$^4$ .............................................. B23K 9/12
[52] U.S. Cl. .............................. 219/124.34; 219/125.1; 318/575
[58] Field of Search ........................ 219/124.34, 125.1; 318/575, 578; 901/42

[56] References Cited

U.S. PATENT DOCUMENTS

| | | |
|---|---|---|
| 3,452,180 | 6/1969 | Bollinger et al. . |
| 3,530,273 | 9/1970 | Bollinger et al. . |
| 3,542,996 | 11/1970 | Bollinger et al. . |
| 3,568,029 | 3/1971 | Bollinger . |
| 3,594,540 | 7/1971 | Weinfurt . |
| 3,833,788 | 9/1974 | Hovance et al. . |
| 3,924,094 | 12/1975 | Hansen et al. . |
| 3,997,757 | 12/1976 | Cecil et al. . |
| 4,068,154 | 1/1978 | Cecil et al. . |
| 4,124,792 | 11/1978 | Flora et al. . |
| 4,151,394 | 4/1979 | Cecil . |
| 4,158,161 | 6/1979 | Suzuki et al. . |
| 4,215,299 | 7/1980 | Edwin et al. . |
| 4,249,062 | 2/1981 | Hozumi et al. . |
| 4,255,643 | 3/1981 | Balfanz ............................ 219/124.34 |
| 4,258,425 | 3/1981 | Ramsey et al. . |
| 4,288,020 | 9/1981 | Searles et al. . |
| 4,296,306 | 10/1981 | Nomura et al. . |
| 4,390,775 | 6/1983 | Biava et al. ..................... 219/124.34 |
| 4,418,266 | 11/1983 | Rosenbeck et al. ............. 219/124.34 |

OTHER PUBLICATIONS

Kendall W. White, "Guidance of Welding Robots", M.S. Thesis, University of Wisconsin-Madison, 1980.
J. G. Bollinger et al., "Computer Controlled Self-Programming Welding Machine", Welding Journal, May 1979.
J. G. Bollinger et al., "Automated Welding Using Spacial Seam Tracing", Welding Journal, Nov. 1971.
K. Lau et al., "Automatic Contour Measurement for Two-Dimensional Geometry", 1982 Proceedings of North American Manufacturing Research Conference, Hamilton, Canada, May 1982.

Primary Examiner—Clifford C. Shaw
Attorney, Agent, or Firm—Isaksen, Lathrop, Esch, Hart & Clark

[57] ABSTRACT

An automated welding apparatus (20) supports a work head (30) for motion in at least two dimensions along a seam (24) in a work piece (21). A tactile sensing probe (33) is mounted to the work head (30) to rotate about it and is controlled so that the tip (35) of the probe is in contact with a wall (26) of the seam at a constant force or deflection. The position of the probe (33) as it contacts the seam wall is sampled and stored to establish a data base for the geometry of the seam wall, and the work head (30) is then driven to follow the established data base while the probe (33) precedes it acquiring new data for the seam wall geometry. The work head may include a welding head (31) rotatable about an axis which can be controlled to be directed at a constant angle with respect to a normal to the seam wall.

21 Claims, 20 Drawing Figures

SELF-GUIDED WELDING MACHINE

TECHNICAL FIELD

This invention pertains generally to the field of metal working and welding machines, and particularly to systems capable of automatically determining a part contour and guiding a welding head or other work head along the contour.

BACKGROUND ART

In the production of a large variety of industrial products, it is necessary to weld metal parts together along a relatively long seam or joint. The seams may be formed, for example, where parts of an automobile or truck frame are butted together, where large metal plates are overlapped, or at butt joints formed between metal plates, as in the plates forming the hulls of ships or large pressure vessels. Most commonly, such welding has been done with manually operated arc welders or by semi-automatic welding machines that carry an arc welding head but are guided along the seam or joint by an operator.

Various automatic welding systems have been developed in an effort to automate such welding procedures. A fully automated system, which does not require substantial intervention by a human operator, must be capable of determining the position of the seam and must be able to guide the welding head along this seam. For some types of parts to be welded together, the location of the seam from part to part is very consistent, and it may then be possible to use standard numerically controlled preprogramming techniques to define the position of this seam and to guide the welding head along it. However, it is more typical in production situations for the position of the seam to vary from part to part, either because of tolerance variations in the parts themselves or in the positioning of the part in its fixture, with the result that guidance of the welding head by standard numerical control programming is not feasible.

Thus, to truly automate the typical seam welding operation, it is necessary for the welding machine to be capable of sensing the position of the seam and to use the information so determined to guide a welding head in proper position to accurately deposit the weld metal in the seam. A variety of approaches have been proposed for sensing the seam including magnetic sensors, optical sensors, electrical resistivity sensors which sense the current flowing through the arc welding rod, and tactile sensing probes. The machine must then utilize the data provided from the sensor to track the sensor accurately along the seam, to determine the position of the sensor when it is tracking the seam, and to use the position information from the sensor to position the welding head to deposit metal at the right spot in the seam. Desirably, the welding machine should be able to define the location of the seam with precision and guide and orient the welding head to deposit the weld with commensurate precision, all at a relatively high speed, without operator intervention, and without loss of capability when welding complex non-linear seam contours which may vary from work piece to work piece.

SUMMARY OF THE INVENTION

The welding machine of the present invention is guided by a tactile sensing probe extending ahead of the work head in its direction of travel to locate a wall of the seam which the work head will follow. The probe is mounted to the work head to move with it, but is independently controlled to rotate about the head so that the probe can track a non-linear seam. Where the work head carries a welding head, the seam position data obtained by the probe is stored and can later be used to position the welding head properly with respect to the seam. The data obtained by the probe and analyzed by this system provides information not only on the location in space of the seam but also, where appropriate, the orientation in space of a wall of the seam (i.e., by determining vectors normal to the wall at points along the wall) and this information is used to rotationally orient the welding head to place the weld at the proper position in the seam. The machine is capable of carrying out these operations rapidly over seams of non-linear, two dimensional geometry, including seams having corners up to 90 degrees, without requiring prior knowledge of the seam geometry.

The apparatus of the invention includes a support structure capable of supporting the work head for motion relative to the work piece in two dimensions and includes drivers, such as electric motors, which are responsive to control signals to drive the work head at a commanded speed in its permitted directions of motion. The tactile sensing probe is mounted by a link arm to the work head for rotation with respect thereto and has a tactile sensing tip mounted in position to be deflected by contact with an object, such as the wall of the seam. The sensing probe provides an output signal which indicates the magnitude and direction of the deflection of the tip. The sensing probe is driven in rotation about the work head in response to a control signal and the relative angular position of the probe with respect to the work head and the coordinate position in space of the work head itself are sensed. The deflection signals from the probe and the signals indicating the position of the work head and the rotational position of the probe are used by a controller which simultaneously determines the position in space of the work head and the probe and which controls the probe to follow the intersection wall by rotating the probe with respect to the work head to maintain a substantially constant deflection of the probe tip, while simultaneously moving the work head forwardly along the intersection wall as determined from the data obtained from the probe as it precedes the work head. The controller also may utlize the information provided by the probe to determine the spatial orientation of vectors normal to the intersection wall at a series of spaced position data points as the probe moves along the wall.

The work head of the welding machine preferably includes a main support member to which the welding head is mounted for rotation about an axis. A drive motor selectively drives the welding head in rotation about its axis in response to a control signal and the rotational position of the welding head with respect to the support member is sensed and provided to the controller. A link arm is mounted to the support member for rotation about an axis parallel to the axis of rotation of the welding head and has the sensing probe mounted on its outer end. The link is driven in rotation by a drive motor responsive to a control signal from the controller and a sensor is provided to determine the rotational position of the link. The data stored by the controller which defines the normal vectors to the intersection wall at points along the wall can be used by the controller to rotate the welding head so that the head is always pointed toward the intersection wall. A digital computer is preferably utilized as the controller to perform the data storage and manipulation functions and to control the drivers for the work head and probe.

Further objects, features and advantages of the invention will be apparent from the following detailed description taken in conjunction with the accompanying drawings showing a preferred embodiment of the invention.

BEST MODE FOR CARRYING OUT THE INVENTION

Figure 1:
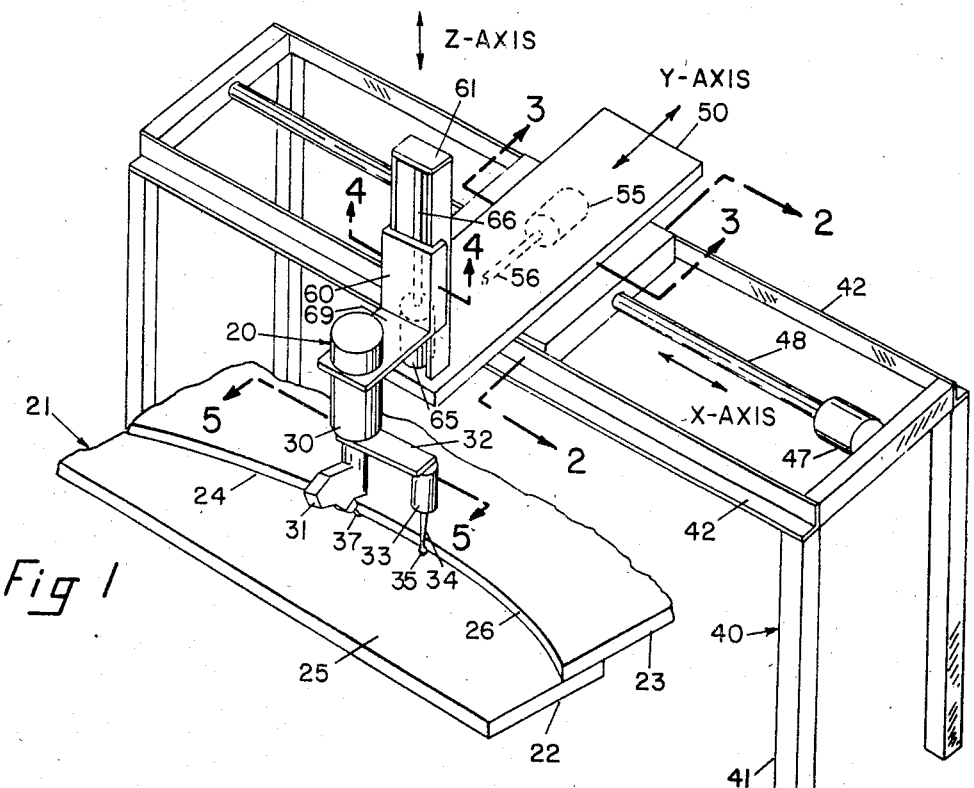
FIG. 1 is a somewhat simplified perspective view of the tracing and welding apparatus of the invention shown in position to weld an illustrative work piece.

With reference to the drawings, a simplified perspective view of the automated welding apparatus of the present invention is shown generally at 20 in FIG. 1 in position to weld a work piece 21 which, for illustrative purposes, is shown as two overlapped metal plates 22 and 23 which meet at a seam or joint 24. For purposes of description herein, a seam will be considered the line at which two surfaces intersect and at which it is intended that a weld be laid. In the work piece show in FIG. 1, the two surfaces which intersect at the seam 24 are the flat top surface 25 of the lower plate 22 and the upright edge 26 of the upper plate 23. For purposes of definition, both the edge surface 26 and the top surface 25 can be considered intersection walls in that these surfaces intersect to form the seam line 24. In the welding example shown in FIG. 1, it is intended that the welding machine follow the intersection wall defined by the edge 26 to lay a weld bead along the seam line 24, although it should be understood that other welding configurations, such as V-grooves formed where two plates abut may also be tracked in accordance with the present invention by following one or the other of the walls forming the groove.

The apparatus 20 has a work head 30 which includes the welding head 31, and a link arm 32 which is rotatable about the work head 30 and carries a tactile sensing probe 33 on its outer end. The probe 33 has a stylus 34 with a ball shaped sensing tip 35 at its lower end. The discussion herein will be with specific reference to an arc welding head 31 which has an electrode wire 37 that is melted by the action of the electric arc to form the weld. However, it should be understood that the work head may mount other types of welding heads and can, if desired, be used for support of other types of operating heads such as gas torches, gluers, mechanical cutters, laser cutting tools, grinders and brushes or the like, although the present system is particularly suited to the guidance and control of arc welders.

Figure 2:
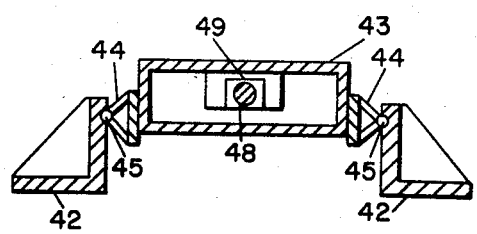
FIG. 2 is a cross-section through a portion of the X-axis support carriage taken generally along the lines 2—2 of FIG. 1.
Figure 3:
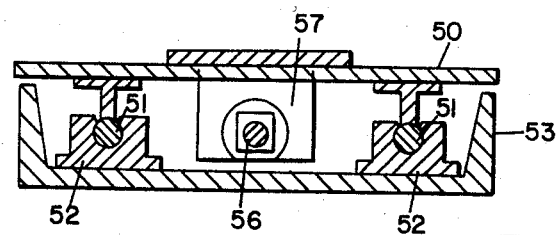
FIG. 3 is a cross-section through the Y-axis carriage taken generally along the lines 3—3 of FIG. 1.
Figure 4:
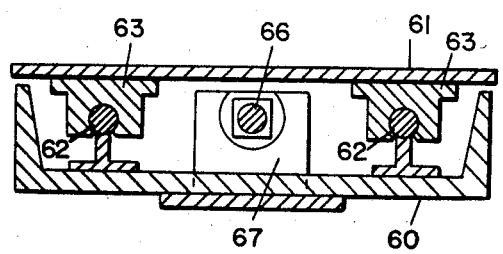
FIG. 4 is a cross-section through the Z-axis carriage taken generally along the lines 4—4 of FIG. 1.

The seam 24 defined by the intersection of the plates 22 and 23 lies in a single plane (e.g., a horizontal plane) but does not necessarily lie along a straight line, and may be curved, as shown in FIG. 1, or have sharply defined corners. To track the seam 24, the work head 30 must be able to move relative to the work piece 21 in any direction in the horizontal plane (as designated herein, horizontal motion will be motion in a X-direction and in a Y-direction). This can be accomplished by mounting the work piece 21 for motion in X- and Y-directions while the work head remains stationary, by mounting the work head for motion in the X- or Y-direction and the work piece for motion in the other direction, or by holding the work piece stationary and mounting the work head for motion in X- and Y-directions. For illustration, the work head 30 in FIG. 1 has a support structure 40 which supports it for X and Y motion with respect to a stationary work piece. This support structure includes a platform 41 having a pair of parallel rails 42 between which an X direction carriage 43 is mounted for sliding movement back and forth. As shown in the cross-sectional view of FIG. 2, the carriage 43 is supported by roller chain bearings 44 which slide on hardened roundways 45 mounted to the rails 42. The carriage 43 is driven back and forth by an electric motor 47 turning a lead screw 48 which engages a threaded sleeve 49 mounted to the carriage 43. A resolver (not shown) is coupled in a conventional manner to the lead screw to provide X-axis displacement information. A Y-axis carriage 50 is mounted to the carriage 43 for movement back and forth thereon in the Y-direction. A shown in the cross-sectional view of FIG. 3, the Y-axis carriage 50 is mounted for sliding motion on hardened roundways 51 which slide in ball bushing pillow blocks 52 (e.g., Thomson Super Ball bushing pillow blocks), mounted on a support channel 53 which is attached to the X-axis carriage 43. The Y-axis carriage is driven back and forth by an electric motor 55 and lead screw 56 (as illustrated in the dashed lines in FIG. 1, with the lead screw 56 passing through a threaded collar 57 attached to the Y-axis carriage 50. A resolver (not shown) is coupled to the Y-axis lead screw for Y-position feedback. To enable the work head 30 to be moved toward and away from the seam 24 and positioned at the proper height with respect to the same, a Z-axis carriage 60 is mounted for sliding motion in the Z-direction (i.e., perpendicular to the plane defined by the X- and Y-directions) on a support plate 61 by hardened roundways 62 which slide in ball bushing pillow blocks 63, as shown in FIG. 4. The support plate 61 is mounted to the Y-axis carriage 50 in a generally vertical orientation (i.e., along the Z-axis). The Z-axis carriage 60 is driven up and down by an electric motor 65 driving a lead screw 66 which is threaded through a collar 67 mounted to the Z-axis carriage 60. The axis carriage may also be provided with negator springs to partially offset the force of gravity on the carriage. A flange plate 69 mounts the work head 30 to the Z-axis carriage 60. A resolver is again coupled to the Z-axis lead screw to provide Z-position feedback. The servo-motors 47, 55 and 65 may have tachometers incorporated therein to provide velocity feedback signals for each axis. The motors may also be coupled to the lead screws with gears, chains or belts for reduction gearing, if desired.

Figure 5:
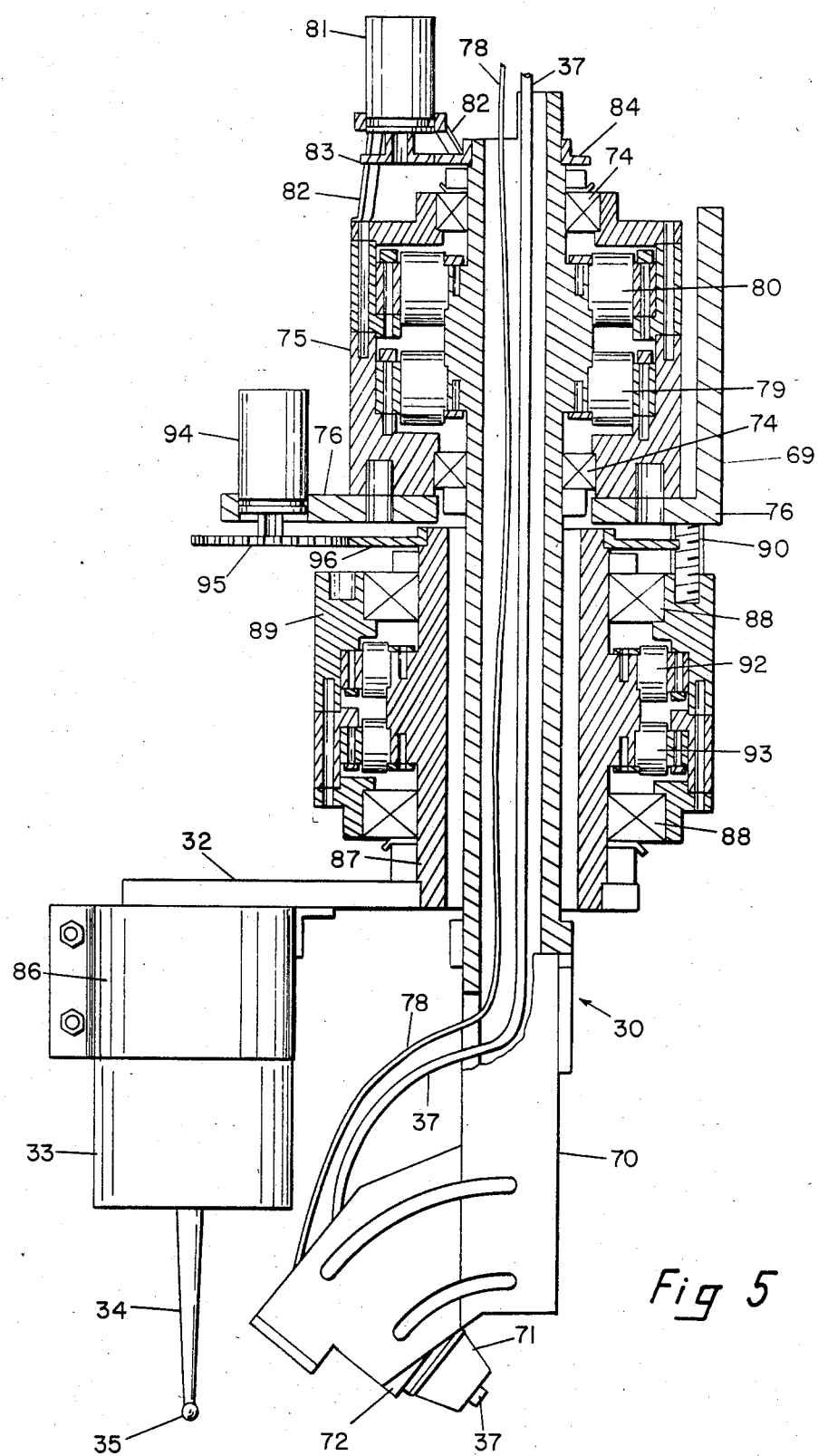
FIG. 5 is a cross-section through the work head and probe of FIG. 1 taken generally along the lines 5—5 of FIG. 1.

A cross-section of the work head 30 is shown in FIG. 5. The work head has a main welder support shaft 70 on which the welder head assembly 71 is mounted with the electrode wire 37 directed at an angle with respect to the vertical or Z-axis. A welder head adjustment bracket 72 is provided to adjust the angle at which the electrode wire 37 exends downwardly. The main welder support shaft 70 is mounted for rotation about its axis (referred to herein as the $\Phi$ axis) by ball bearings 74 to a generally cylindrical $\Phi$ axis welder base member 75. The base member 75 is rigidly mounted to a main support member 76 which is attached to the support flange 69. The welding electrode wire 37 and the electrical current supply wire 78 extend upwardly through the hollow bore of the welder support shaft 70. The shaft 70 is driven for rotation about its axis by a DC torque motor 79 and the speed of rotation is sensed by a tachometer 80. The rotational position of the support shaft 70 about the $\Phi$ axis is sensed by a resolver 81 supported by mounting brackets 82 on the base 75; its shaft 70 is connected by an anti-backlash gear 83 to a resolver ring gear 84 mounted around the shaft.

The probe 33 is preferably connected to the link arm 32 with an adjustable collar 86 which can be loosened to move the probe 33 up or down so that the probe tip 35 can be properly located vertically. With the collar 86 tightened, the probe remains fixed in the selected vertical position. The link arm 32 is attached to a support shaft 87 having a hollow bore through which the welder support shaft 70 passes. The probe support shaft 87 is mounted for rotation about an axis (referred to herein as the $\theta$ axis) by ball bearings 88 to a $\theta$ axis support base 89 which encircles the probe support shaft 87. The $\theta$ axis of rotation of the link arm is parallel to the $\Phi$ axis about which the welding head rotates and is preferably coincident with it. The base 89 is in turn rigidly mounted to the main support member 76 by threaded studs 90 (one shown in FIG. 5) at spaced positions about the top of the base 89. Thus, the base 75 and the base 89 are rigidly connected to the main support member 76 and are fixed with respect to each other. The $\theta$ axis probe support shaft 87, the link arm 32 attached thereto, and the probe 33 supported thereon, are driven for rotation by a DC torque motor 92 and the rotational speed about the $\theta$ axis is sensed by a tachometer 93 which provides an electrical signal indicative of the rotational speed. The rotational position of the probe about the $\theta$ axis is sensed by a resolver 94, providing an electrical signal indicative thereof, having its shaft attached through an anti-backlash gear 95 to a ring gear 96 which is mounted around the $\theta$ axis shaft 87. For clarity of illustration, the wires providing electrical power to the motors 79 and 92 and carrying the electrical signals from the tachometers 80 and 93 and the resolvers 81 and 94 are not shown, although it is noted that all of these motors and tachometers are stationary with respect to the main support member 76 so that the wires connected thereto are not affected by any of the rotations of the welder support shaft 70 or the probe support shaft 87. The wires providing the electrical signal from the probe 33, indicating the magnitude of X and Y displacements of the probe tip 35 can be brought back to the Z-axis carriage with sufficient slack provided in the control wires so that the wires do not interfere with rotation of the probe about the $\theta$ axis. Various probes are available which provide proportional output signals upon displacement of the probe tip in the X- and Y-directions, and for some applications it is desirable to utilize a probe which is capable of being displaced in the Z-direction and of sensing displacements therein. An example of a suitable three dimensional proportional probe is shown in copending application Ser. No. 456,962.

In accordance with the present invention, it is an objective to utilize a previously gathered data base describing the part edge geometry to determine drive commands that guide the welding head along the part edge, and simultaneously to record the geometric data base of the part edge ahead of the welding head with the tactile sensing probe. To obtain the speed, accuracy and adaptability desired, the guidance scheme must cause the welding head to track the part edge accurately, utilizing the previously gathered geometric data base information, while maintaining a substantially constant welding velocity and a fixed angle of the welding head with respect to the part edge. To obtain the desired accuracy when tracing the part edge and establishing the data base, it is preferred that the probe remain in continuous contact with the part edge—i.e., a constant deflection of the probe tip or constant force applied to the tip should be maintained—and the geometric position of the probe as it is in contact with the part must be determined.

Figure 6:
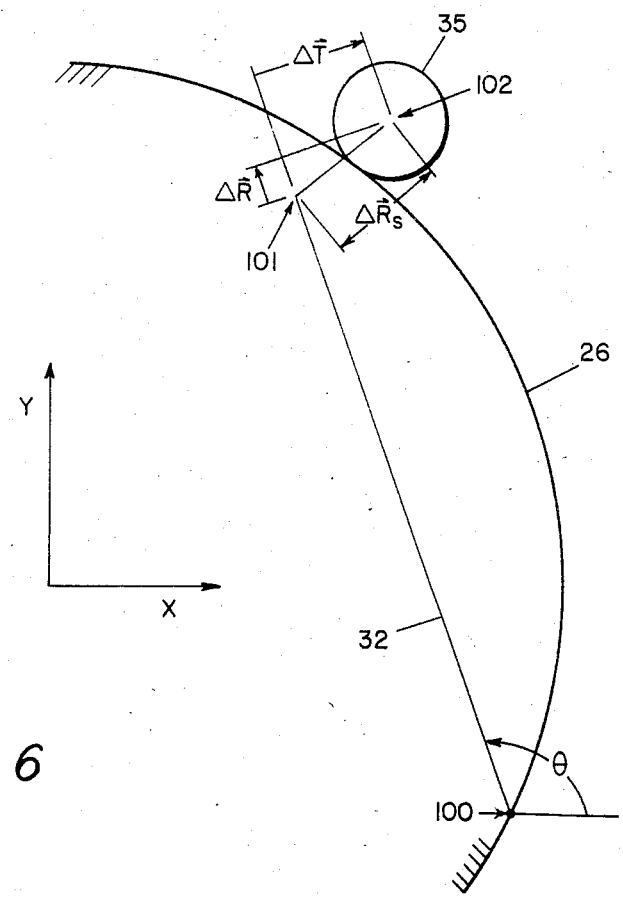
FIG. 6 is a schematic view showing the two dimensional probe deflection geometry utilizing the rotary link configuration of the present invention.

The proportional probe 33 is capable of providing output signals which are a function of the magnitude and direction of deflection of the tactile sensing tip 35. The geometry of the two-dimensional tracing scheme is illustrated in FIG. 6, with the line labeled 26 indicating the part edge or intersection wall, the circle 35 corresponding to the probe tip and the line labeled 32 corresponding to the position of the rotary link arm. The position of the welding head or torch axis, about which the link arm 32 also rotates, is indicated as the point labeled 100. The position in the X-Y coordinate plane of the center axis of the probe is the point labeled 101, and the point 102 is the geometric center of the probe tip. When the probe ball tip 35 is in contact with the part edge or intersection wall 26, the geometric location of the part edge at the probe ball can be calculated from the data obtained from the various position transducers on the machine. It is a prime criteria for continuous tracing of the part that a substantially constant probe deflection or contact force be maintained. Control of the probe deflection as the probe moves along in contact with a part edge of changing contour is thus required. With reference to the diagram of FIG. 6, when the probe ball tip 35 is in contact with the wall, it will be deflected away from its origin 101 by an increment $\Delta R$ in the direction of the link arm and an increment $\Delta T$ in a direction perpendicular to the link arm 32. The distance $\Delta R_s$ between the probe origin 101 and the probe tip sensor 102 will thus be equal to the square root of the sum of the squares of these vector incremental deflections. The probe 33 provides signals proportional to these increments. The calculated probe deflection $\Delta R_s$ can then be compared to a desired deflection $\Delta D$ to generate a deflection error $\Delta E$. Based on the error signal, a control manipulation signal is generated by a proportional control law which is provided (through a servo amplifier) to the torque motor 92 to rotate the link arm 32 until the actual probe deflection $\Delta R_s$ reaches the desired deflection $\Delta D$. The moving probe will thus be controlled to follow the intersection wall as the control loop attempts to maintain a constant deflection of the probe tip.

To establish the data base which describes the geometry of the part edge, the point of contact between the probe tip 35 and the part edge 26 must be calculated in "real time" as the probe tip is moving along the edge. The manner of calculating the part edge data base is best illustrated with reference to FIG. 8. The X, Y coordinates of the point of contact M can be determined from the following equations:

$$M_x = W_x + L \cos \theta + \Delta T \sin \theta - \Delta R \cos \theta \mp r_b \cos \psi$$

$$M_y = W_y + L \sin \theta - \Delta T \cos \theta - \Delta R \sin \theta \pm r_b \sin \psi$$

where: $M_x$ is the X coordinate of the point of contact; $M_y$ is the Y coordinate of the point of contact; $W_x$ is the X coordinate of the welding torch; $W_y$ is the Y coordinate of the welding torch; $\Delta R$ is the deflection of the probe in the radial direction; $\Delta T$ is the deflection of the probe in the tangential direction or the direction normal to the link arm; $\theta$ is the angle of the link arm 32 with respect to the origin; $\psi$ is the angle of the normal vector to the part surface at the point of contact M with respect to origin or X-axis; $r_b$ is the radius of the probe ball tip 35; and L is the length of the link arm 32.

Where two signs appear in the equations above, the upper sign is used for a counterclockwise tracing direction and the lower sign for a clockwise tracing direction. The tracing direction refers to the direction of rotation of the probe and welding torch as they move around the work piece being welded.

$W_x$ and $W_y$ are obtained from the position transducers of the X and Y axis support structures for the work head 30, $\theta$ is obtainable from the resolver 94, and $\Delta R$ and $\Delta T$ are signals obtained from the probe 33. However, the angle $\psi$ of the normal vector to the part surface is not directly available and it must be calculated. This angle can be calculated either by the use of velocity vectors for the probe or by a recursive technique based on the part edge data points that are determined.

Figure 8:
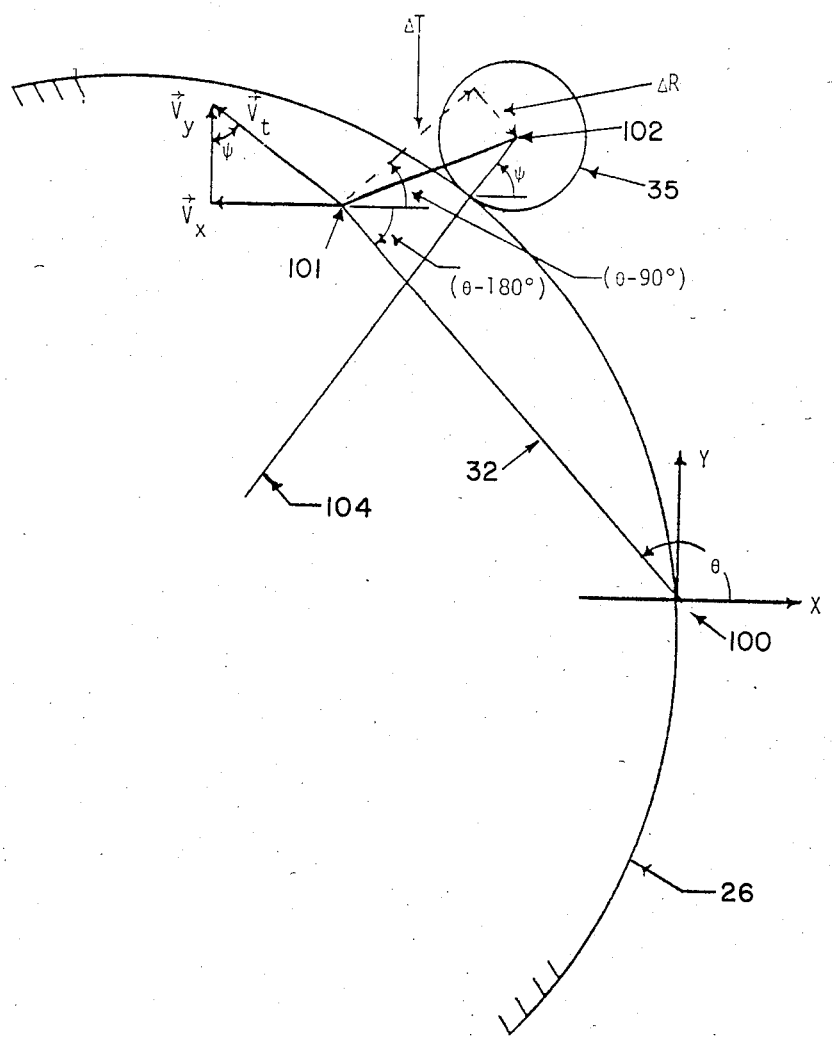
FIG. 8 is a schematic view showing the two-dimensional probe deflection geometry illustrating the calculation of the surface normal at the point of contact of the probe tip with the intersection wall.

The first method for calculating the surface normal relies on the assumption that the direction of the velocity of the probe ball tip 35 at the point of contact is tangent to the part edge at that point so that a constant probe deflection is maintained while tracking the part edge. The angle $\psi$ can be determined from the X- and Y-direction velocity vectors $V_x$ and $V_y$ as illustrated in FIG. 8, and the magnitude of these vectors can be calculated by using the data determined from the transducers for the X and Y motions of the work head and the resolvers indicating the angle $\theta$ of the link arm 32 with respect to the work head and its speed.

A second method for determining the angle of the normal vector 104 utilizes the data points determined for the position of the center 102 of the probe ball tip 35 where the data on the geometric location of the probe ball tip is sampled at discrete intervals. With a knowledge of the position in the coordinate system of the data point at which the probe ball center 102 is presently located and the adjacent (e.g., previous) data point, the normal to the surface at the present data point can easily be calculated. For example, the cosine of the angle $\psi$ will be equal to the difference in Y-direction magnitudes of the two data points divided by the square root of the sum of the squares of the differences in the X-direction magnitudes and Y-direction magnitudes of the two data points. The second method of calculation of the normal is preferred since it is less susceptible to error as a result of oscillations or transient vibrations in the probe tip, which occur primarily as a result of the "stick-slip" phenomona as the probe ball tip slides in frictional contact with the part edge 26.

The data determined for each point along the part edge of the angle of the normal to the part edge at that point can be used to orient the welding torch head 71 so that it points toward the part edge, i.e., so that a line through the electrode wire 37 at the welding head 71 will lie in the same plane as the normal vector to the part edge.

It may be noted that where discrete data for the part edge is gathered, the points that represent the part edge are not necessarily equally spaced along the edge since these points are preferably calculated at constant time intervals, typically one-tenth of the control frequency. Therefore, as the velocity of the probe changes as a function of the part geometry, the points at which data is taken will not have the same spacing. The digitized geometric information on the location of the part edge 26 must be sufficient to allow the welding torch to be accurately positioned and guided along the edge. Each data point taken from the probe measurements corresponds to an X and Y component in the absolute coordinate system. The distance between points is dependent upon the welding velocity since the probe 33 and the work head 30 are, of course, connected by the fixed length rotary link arm 32.

Figure 19:
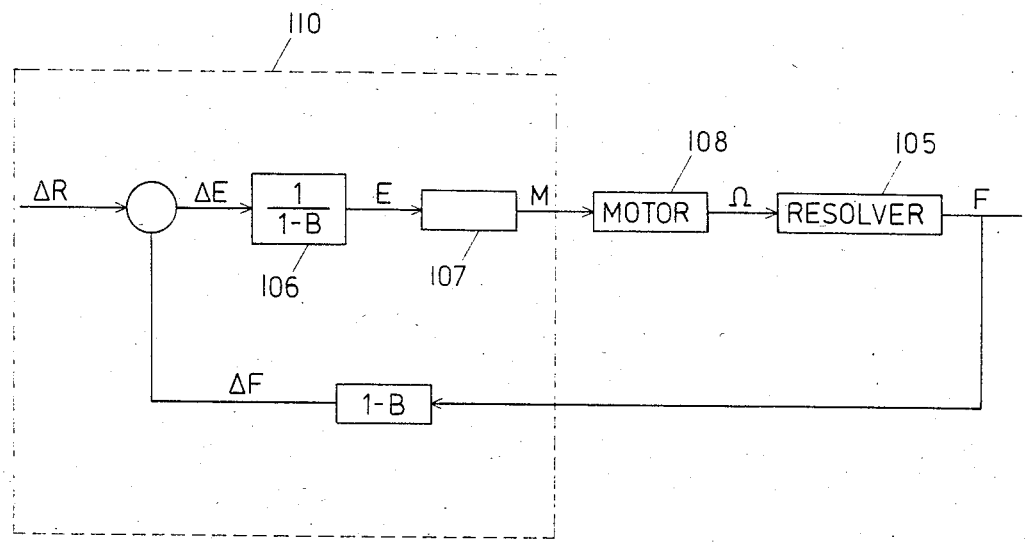
FIG. 19 is a schematic diagram illustrating the form of the X, Y and Φ position control loops.
Figure 20:
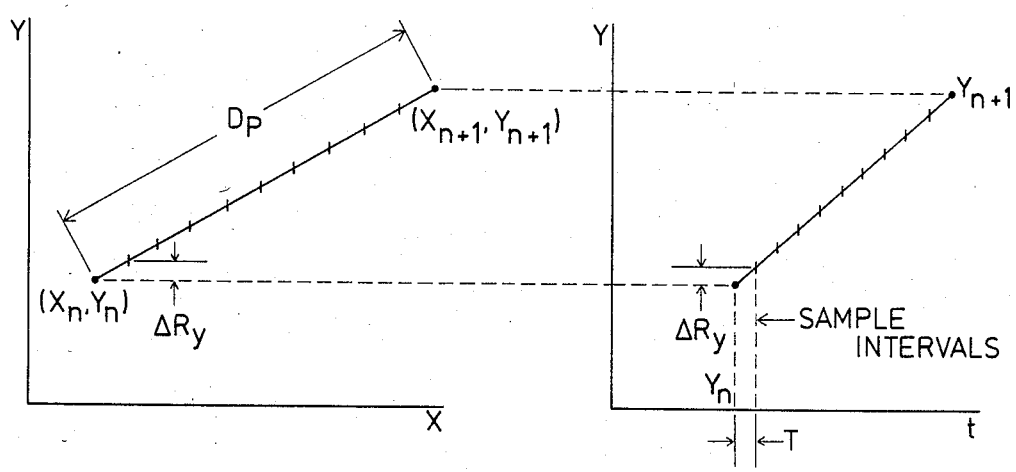
FIG. 20 is a schematic illustration of the calculation of ramp inputs to the controller.

The work head 30 allows three degrees of freedom of motion of the welding head 31, linear motion in the X and Y axes and rotary motion in the $\Phi$-direction about the central axis of the welding head ($\Phi$-axis). A predetermined path for motion in the Z direction may also be implemented, if desired. The X-axis and Y-axis are used to position the central axis of the work head adjacent to the part edge 26, while the $\Phi$-axis drive is used to maintain the welding torch 37 in proper orientation with respect to the normal to the part surface. Control of both the velocity and the position of the welding torch is required. A discrete position control loop as shown in FIG. 19 may be employed such that, with the work head located at an initial position in the X and Y plane, the controller calculates a change of reference input determined by the difference between the present position of the work head and the next adjacent data point as determined from the data base gathered by the probe. For example, with reference to FIG. 20, if $X_n$ and $Y_n$ are the present position of the welding torch and the target position is represented by the point with coordinates $X_{n+1}$ and $Y_{n+1}$, the distance $D_p$ between the two positions will be:

$$D_p = \sqrt{(X_{n+1} - X_n)^2 + (Y_{n+1} - Y_n)^2}.$$

The distance so calculated may be divided by the desired welding velocity $V_w$ to give the time $t_p$ required to reach the target position at the desired welding velocity. Utilizing a discrete controller in which the control reference signals are updated each sample period T, the X and Y discrete ramp function references can be determined as:

$$\Delta R_x(nT) = \frac{(X_{n+1} - X_n)T}{t_p}$$

$$\Delta R_y(nT) = \frac{(Y_{n+1} - Y_n)T}{t_p}$$

With reference to FIG. 19, the position feedback data, which can represent the X, Y or $\Phi$ axis control loop, from the resolver 105 are used to determine the change of position $\Delta F$ during the period T for each axis. The difference between the ramp reference $\Delta R$ for the axis and the change of position $\Delta F$ for the axis provides an error $\Delta E$ for the axis for each period which can be summed at 106 to provide an error drive signal E which can be compensated at 107 in accordance with a proportional or other control law to provide a magnitude signal from a digital-to-analog converter which is supplied to the servo-amplifier and axis drive motor 108.

After the target position is reached, the distance between the next target position and the present position is calculated to yield updated ramp inputs. Utilizing this method, both position control and constant velocity control for the welding head can be achieved. The position and velocity control of the $\Phi$-axis, with rotational positioning of the torch, is similarly implemented.

Figure 7:
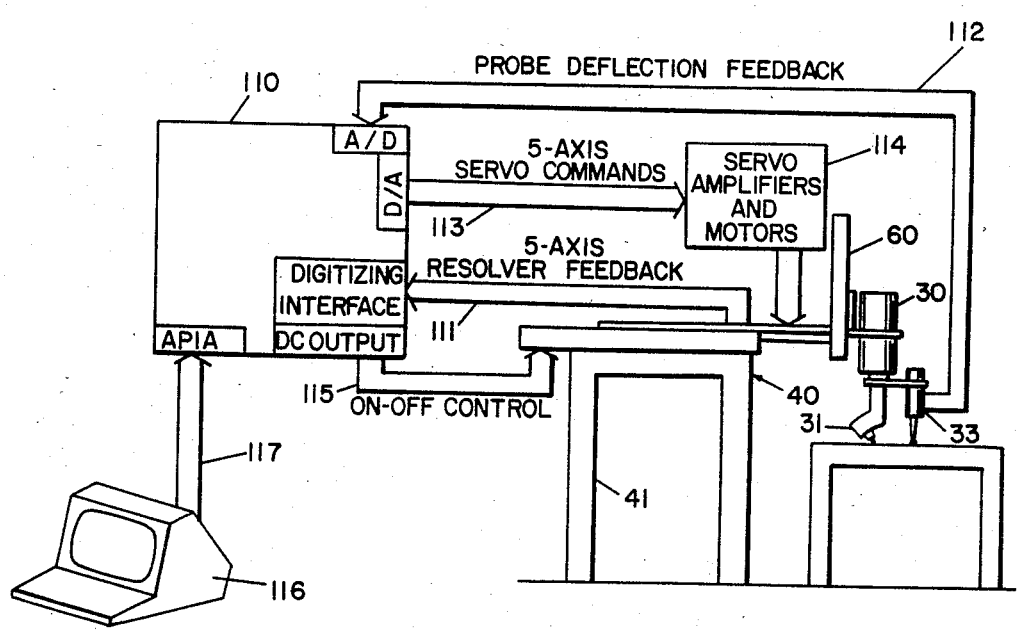
FIG. 7 is an illustrative view showing the main control components of the welding system.

The welding guidance and tracing scheme described above is preferably implemented using a digital computer controller as illustrated schematically in FIG. 7. Inputs to the computer controller 110 include position data from the five servo-axes (the X, Y, Z, $\theta$ and $\Phi$ axes) transducers or resolvers on signal lines 111 and the probe deflection signals on lines 112. Servo-command digital instructions generated in the computer controller are converted to continuous amplitude varying signals in a digital-to-analog converter within the controller and these signals are issued on lines 113 to the servo-amplifiers and motors, as illustrated at 114, which drive the respective axes. On-off control by the computer of all of the servo-drives, as illustrated by lines 115, is provided for emergency shut-off for safety. Operator communication to the computer is provided from a terminal and keyboard 116 on lines 117.

It should be noted that the motors driving the various axes may desirably be provided with tachometers to provide velocity feedback to the servo-amplifiers in a conventional manner. The velocity feedback and the loop gain of the amplifiers can be adjusted as desired to meet performance criteria and to ensure stability.

The function of the computer controller 110 is to execute the two-dimensional tracing and guidance schemes and thus the controller must sample probe deflections, acquire position data from the resolvers or transducers on each of the axes, control the relays which provides on and off control of the machine, provide velocity commands to the machine drives and implement the two dimensional tracing and guidance algorithms. An example of a computer system which has been found suitable for carrying out these objectives is a Giddings and Lewis 868 Microprocessor system which is based on a motorola 6809 microprocessor. The microprocessor system units required for carrying on the operation of controlling the welding machine include a central processing unit, random access memory, programmers control console interface board, analog-to-digital and digital-to-analog converters, floating point arithmetic, digitizing reference and digitizing boards, a direct current output board to provide the on-off control signals, a disk interface, a keyboard and display terminal 116 and diskette drive units.

The software provided for the computer controller 110 implements the two dimensional tracing and welding guidance scheme described above. The program makes use of the "foreground and background" concept, wherein the background has the higher priority and interrupts the foreground. The background performs the real-time process or servo-control at a chosen control frequency (e.g., 62.5 Hz). Upon an interrupt, position feedback information is obtained from the resolvers on the machine axes and from the probe transducers. Based on these values and the reference input values to the respective control groups, control signals are calculated and supplied to the machine drives.

Figure 9:
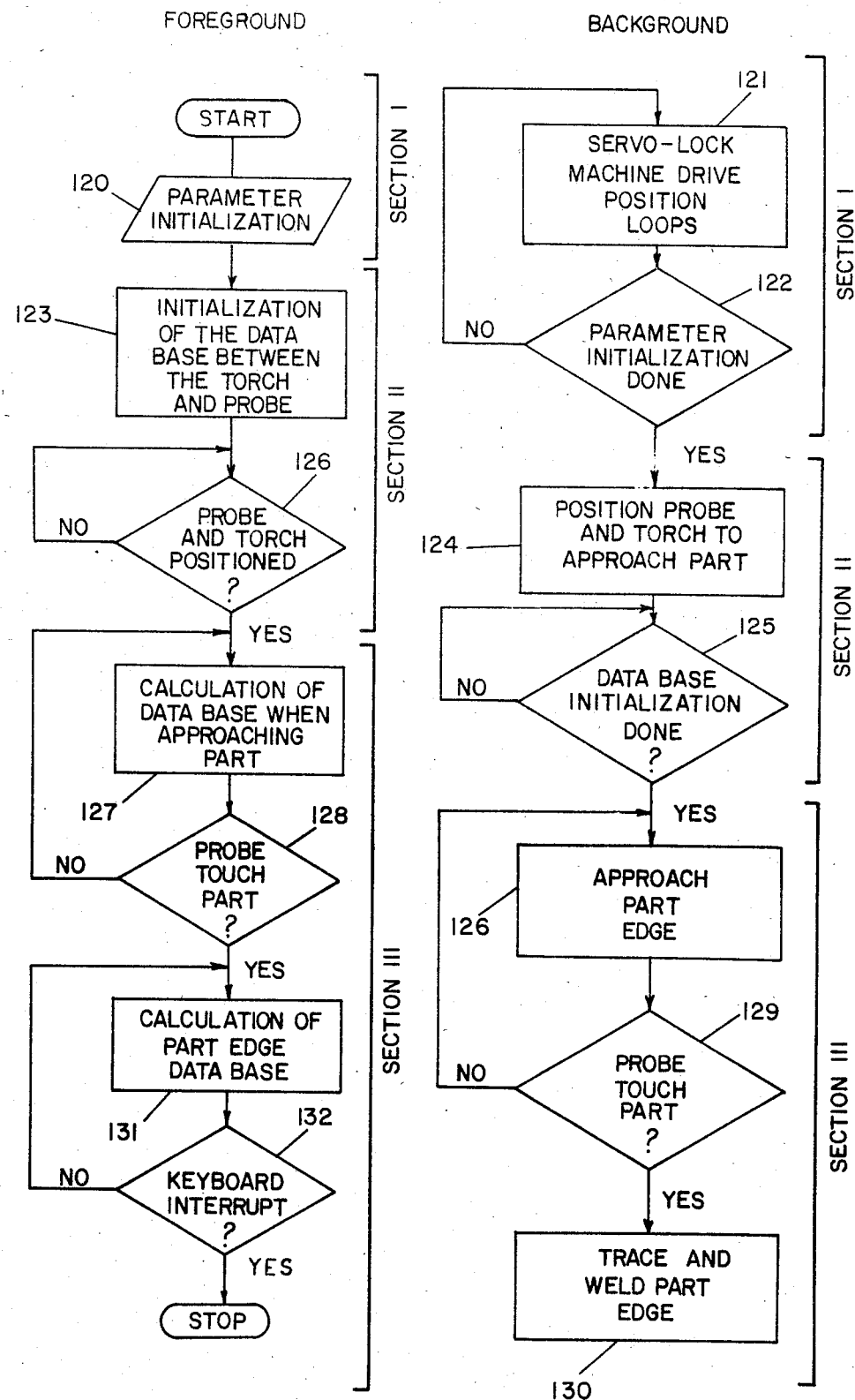
FIGS. 9-17 are flow charts illustrating the operation of the computer program which performs the acquisition of position data from the probe and work head, the control of the deflection of the probe tip to guide the probe about the intersection wall, and the guidance of the work head itself to follow in the track of the probe.

With reference to FIG. 9, the program starts with control parameters that are entered interactively by the user in the foreground (block 120). Also, system operation instructions are displayed on the video terminal and constants and variables are defined. During this process, in the background, position control loops are held in a servo-lock mode to eliminate drift in the machine drives (block 121 and block 122). In the second section of the program, the data base between the welding head and probe is initialized in the foreground (block 123), establishing an approach vector into the part edge which can be used for guidance of the welding head. The approach angle is obtained from the user in the parameter initialization step. In the background, the probe and welding head are positioned for approaching the part edge (block 124 and 125).

When the probe and welding head are initially positioned (block 126), the program proceeds to the third section in which the probe and welding head approach the part edge (block 126) and the data base of the probe when approaching the part is established (block 127). When the probe touches the part (block 128, 129), the background program controls the work head and probe to trace and weld the part edge (block 130) while in the foreground the part edge data base is calculated (block 131) and the calculation procedure is continued until welding is completed or a keyboard interrupt is received (block 132).

In the background, servo-commands to the X, Y, and $\Phi$ axis drives are generated to cause the welding head to follow the path of the data base. Before part contact is made by the probe tip, the $\theta$ axis is held along an initial approach angle with a position control loop. Once contact is made by the probe, the position control loop on the probe axis is bypassed and the deflection control loop is activated; thereafter, the automatic tracing scheme is employed to scan the part edge.

Figure 10:
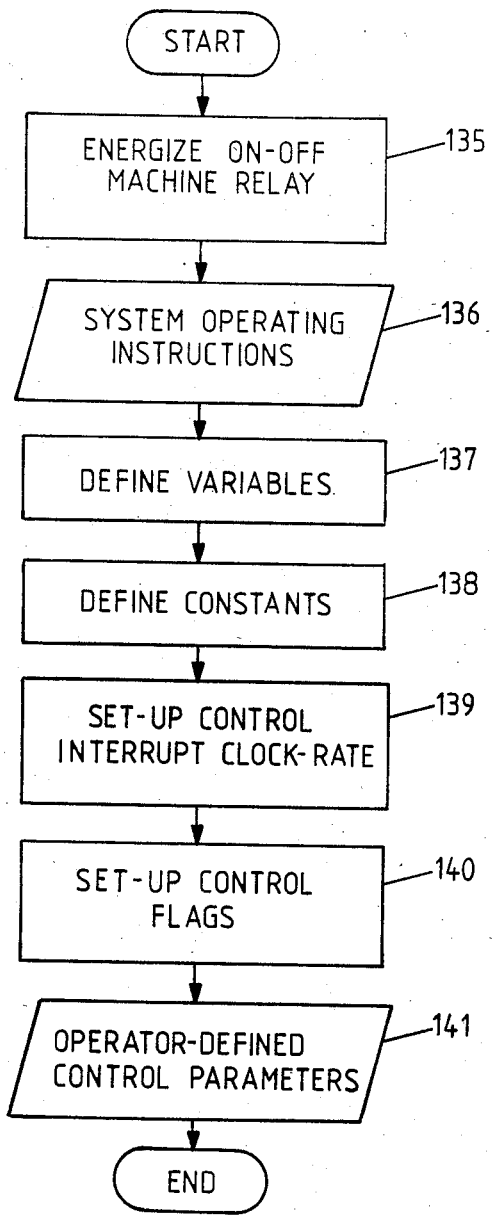

The main program functions outlined above are discussed in specific detail below:

The parameter initialization function is conducted in the foreground during which time the operating instructions are displayed to the user on the terminal. The parameter initialization routine, as shown in the flowchart of FIG. 10 begins, with energization of the on-off machine relay (block 135) and proceeds to the step of receiving the system operating instruction (block 136)

in which variables (block 137) and constants (block 138) are defined and the interrupt rate (block 139) and control flags (block 140) are set. The control parameters for implementing the tracing and guidance scheme are entered interactively (block 141) and include the reference probe deflection, the desired welding velocity, the tracing trend, the welding head lead angle, and the approach angle. The reference probe deflection is the desired deflection to be maintained by the probe during continuous tracing and a constant welding velocity is one of the control direction objectives. The work piece can be tracked in either the clockwise or counterclockwise direction, and the operator chooses the most suitable direction. The welding head lead angle is the angle at which the head or wire 37 is oriented to the part edge. The lead angle is generally maintained such that the plane in which the welding head lies is normal to the part edge, but this angle can be varied if desired. The user enters the desired approach angle, which will cause the probe and welding head to move in that direction until contact by the probe with the part occurs.

Figure 11:
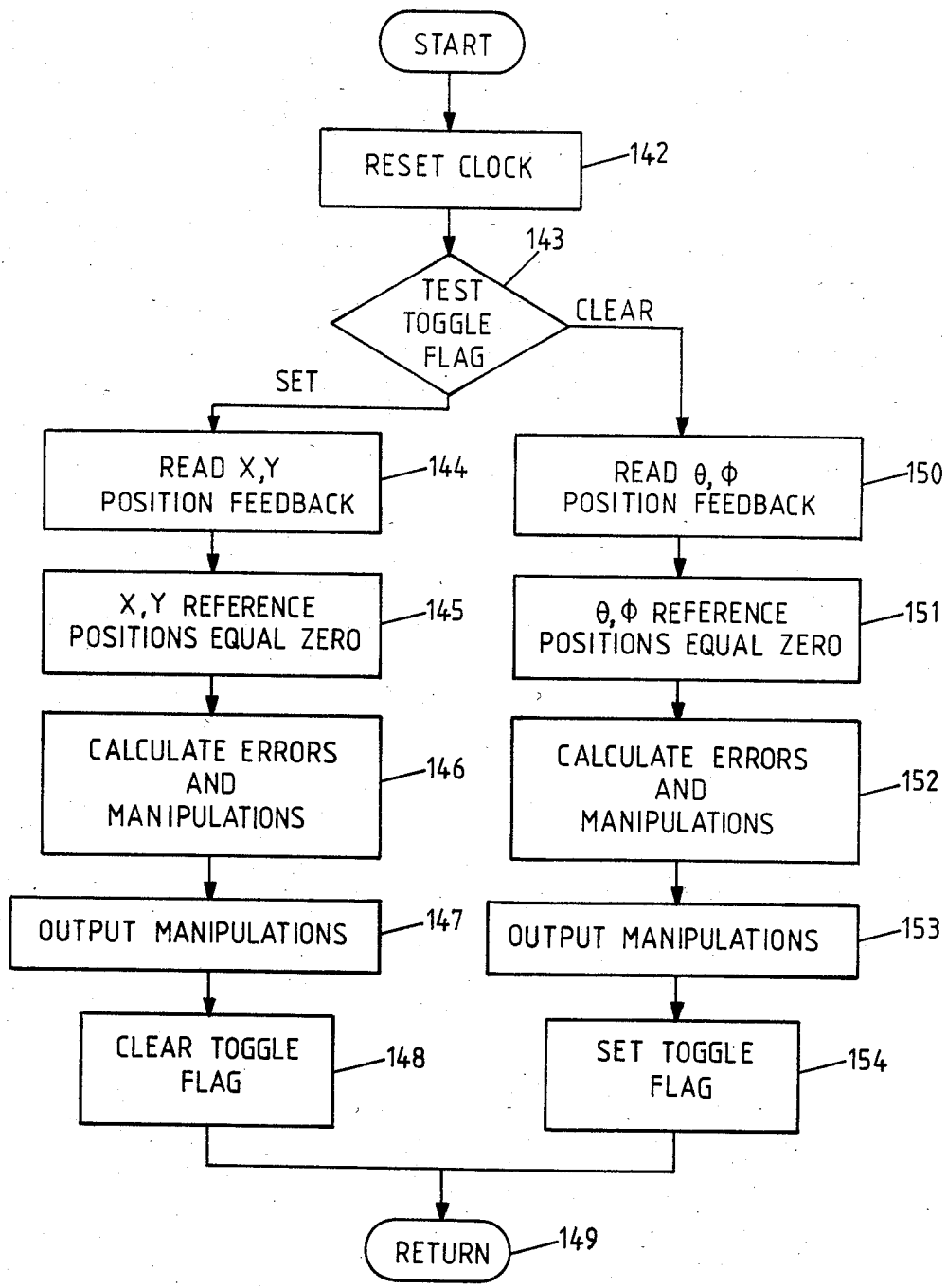

The background position control loops are set forth in the flow chart of FIG. 11 and are updated when interrupts occur. The sequence through the program is structured so that only two axes are controlled at each interrupt. For example, upon an interrupt, after the clock is reset (block 142) the toggle flag is tested (block 143) and if it is set, the X and Y position feedback is read (block 144). The X and Y reference positions are set to equal zero (block 145) and an error signal is calculated along with the manipulation signal required to correct the error (block 146) in accordance with a proportional control law, the manipulation signals are provided to the digital-to-analog converters which output continuous signals proportional to the desired drive signal to the servo-drives (block 147), and the toggle flag is cleared (block 148) before the program is set for return (block 149) at the next interrupt. Upon the next interrupt, since the toggle flag is clear, the $\theta$ and $\Phi$ position feedback data is read (block 150), the $\theta$ and $\Phi$ reference positions are set at zero (block 151), the error and manipulation signals are calculated (block 152) and the manipulation signals outputted (block 153). The toggle flag is then set (block 154) and the program returns. This procedure can be utilized to allow this position data to be acquired with two digitizing boards which can read only two axial resolvers per interrupt. At an interrupt rate of 125 Hz, the effective servo-control frequency is 62.5 Hz, which allows satisfactory system response and stability.

Figure 12:
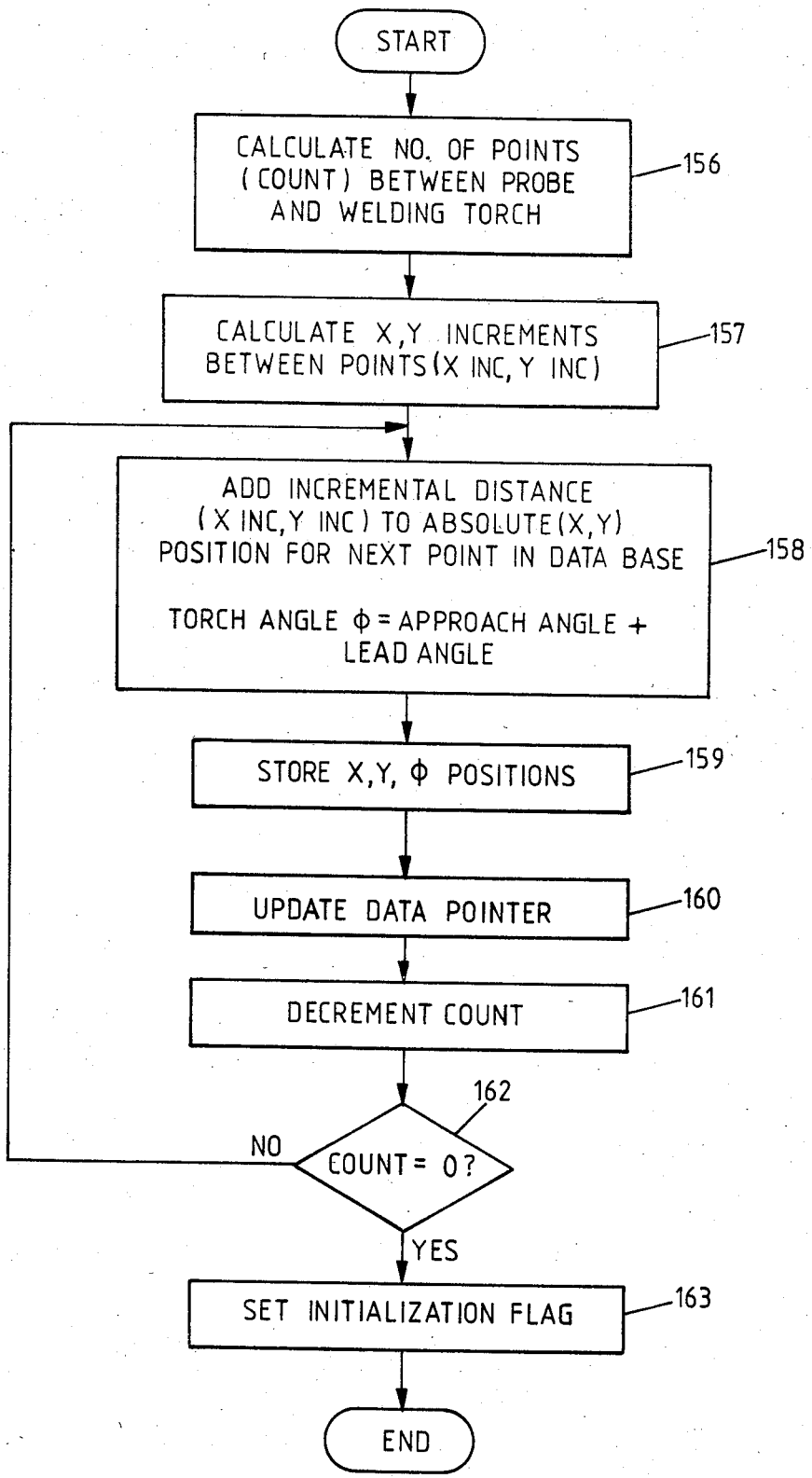

Initially, the computer controller has no knowlege of the part edge or the orientation of the welding head and probe with respect to the part edge. At the parameter initialization stage, the approach vector is entered to give the program a direction to search for the part. With this angle known, a series of points are calculated in the foreground along the search vector for the distance between the welding head and the probe. This provides an initial path for welding head guidance into the part edge. The number of points acquired is dependent on the welding velocity and the probe-welding head separation distance. As illustrated in the flow chart of FIG. 12, the number of points (count) between the probe and the welding torch is calculated (156) and the X and Y increments between the points are calculated (157). The incremental distance is then added to the absolute position of the welding head to determine the next point in the data base and the torch angle is set at the approach angle plus whatever lead angle has been set for the welding head (158). The X, Y, and $\Phi$ positions are stored (159), the data pointer is updated (160) and the counter is decremented (161). The count is then tested to determine if it is zero (162) and, if not, the program proceeds to begin to add another incremental distance to the absolute position for the next point in the data base (158) to repeat the cycle. When the count reaches zero, the initialization flag is set (163) and this section of the foreground program is ended.

Figure 13:
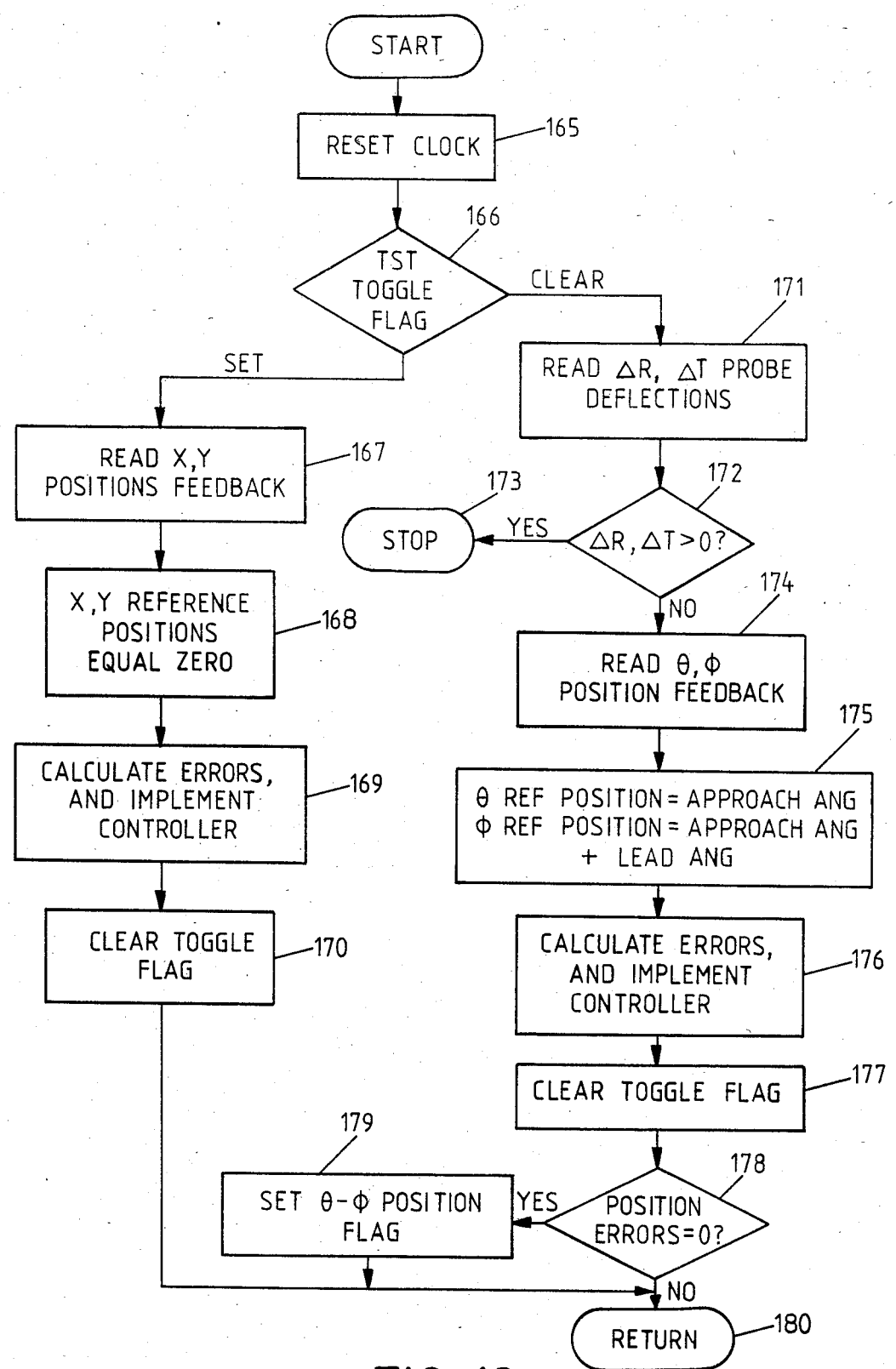

A flow chart of the background program of this section is shown in FIG. 13. After the interrupt, the clock is first reset (165) and the toggle flag is tested (166). For example, if the flag is set, the X, Y position feedback data are read (167), the X, Y reference positions set equal to zero (168), the errors calculated and the controller implemented (169), and the toggle flag clear (170) before return to wait the next interrupt. Upon the next interrupt, the toggle flag tests clear and the probe deflections are read (171); if either of the probe deflections are greater than zero upon test (172), this condition indicates that the probe is sensing a deflection while being positioned at the approach angle, and the flag is then set for emergency stop (173) indicating the part is too close to the rotary link. Assuming that the probe is not deflected as it is turned to approach the part, the $\theta$ and $\Phi$ positions are read (174) and the $\theta$ and $\Phi$ reference positions are set at the approach angle and the approach angle plus the lead angle, respectively (175). The control errors are then calculated and the controller is implemented (176), and the toggle flag is cleared (177). If the position errors equal zero (178), a flag is set indicating that the initial $\theta$ and $\Phi$ positions have been reached (179) and the program returns to wait for the next interrupt (180). If the position errors do not equal zero, the program immediately returns.

Figure 14:
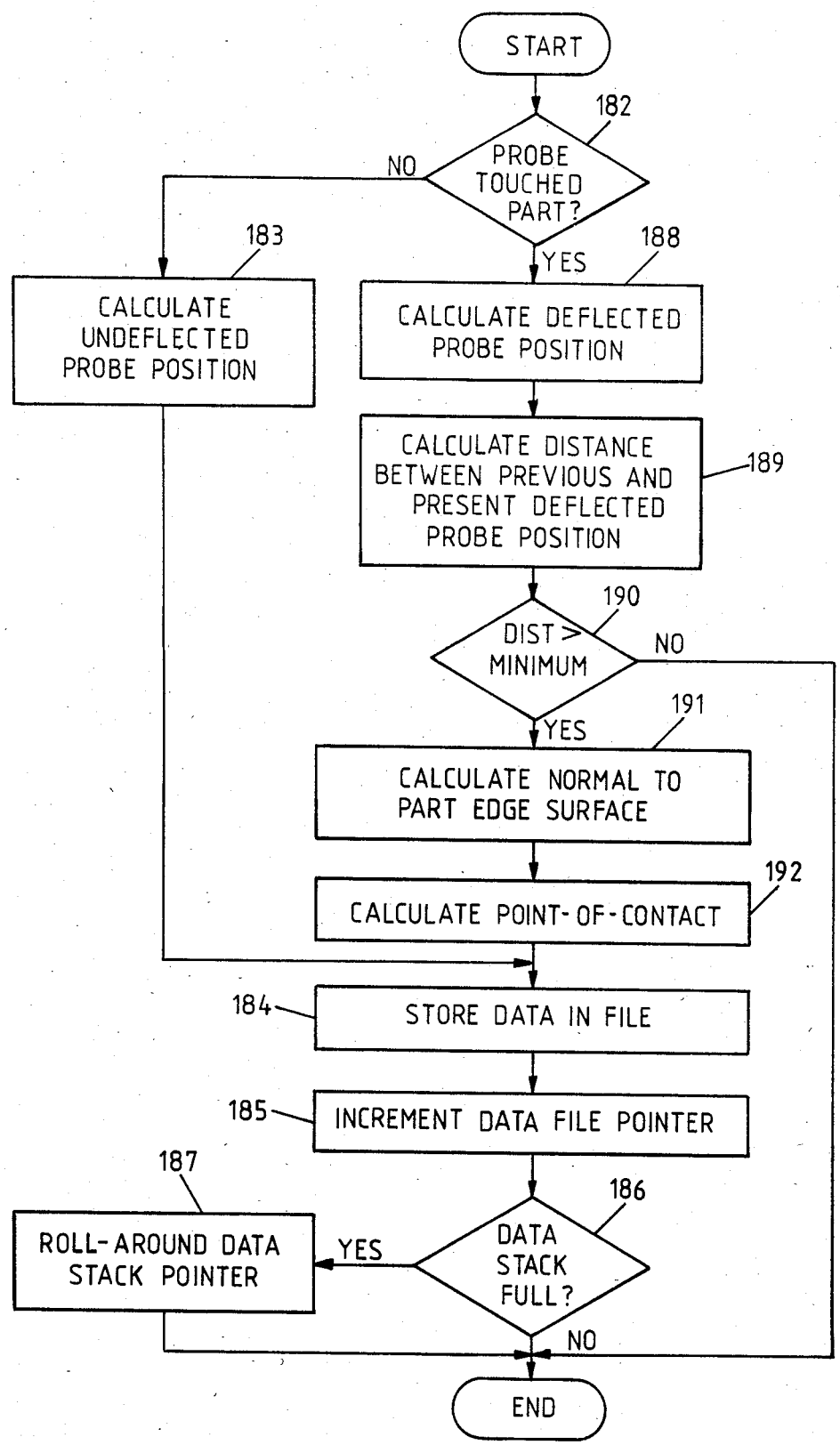

The flow chart for the foreground of the part search and tracing and welding guidance algorithm is shown in FIG. 14. As the welding head approaches the part, the probe is held in a position along the initial approach angle by means of a position control loop. The foreground calculates the probe location as it progresses toward the part, constantly supplementing the data base. If the probe has not yet touched the part (182), the undeflected probe position is calculated (183), the data stored in the file (184), the data file pointer incremented, and the data stack tested to see if it is full (186). If not, the program is ended; if so, the data stack pointer is rolled around (187) before the program is ended. When the probe touches the part, the deflected probe position is calculated (183), the distance between the previous and the present deflected probe positions are calculated (184) and a determination is made whether the distance is greater than a chosen minimum (185); if not, the program continues and allow the probe to move further toward the part; if so, the normal to the part at the surface is calculated (186), the point of contact is calculated (187) and the data is then stored in the file, the data file pointer incremented and the data stack tested to determine if it is full (186).

Figure 15:
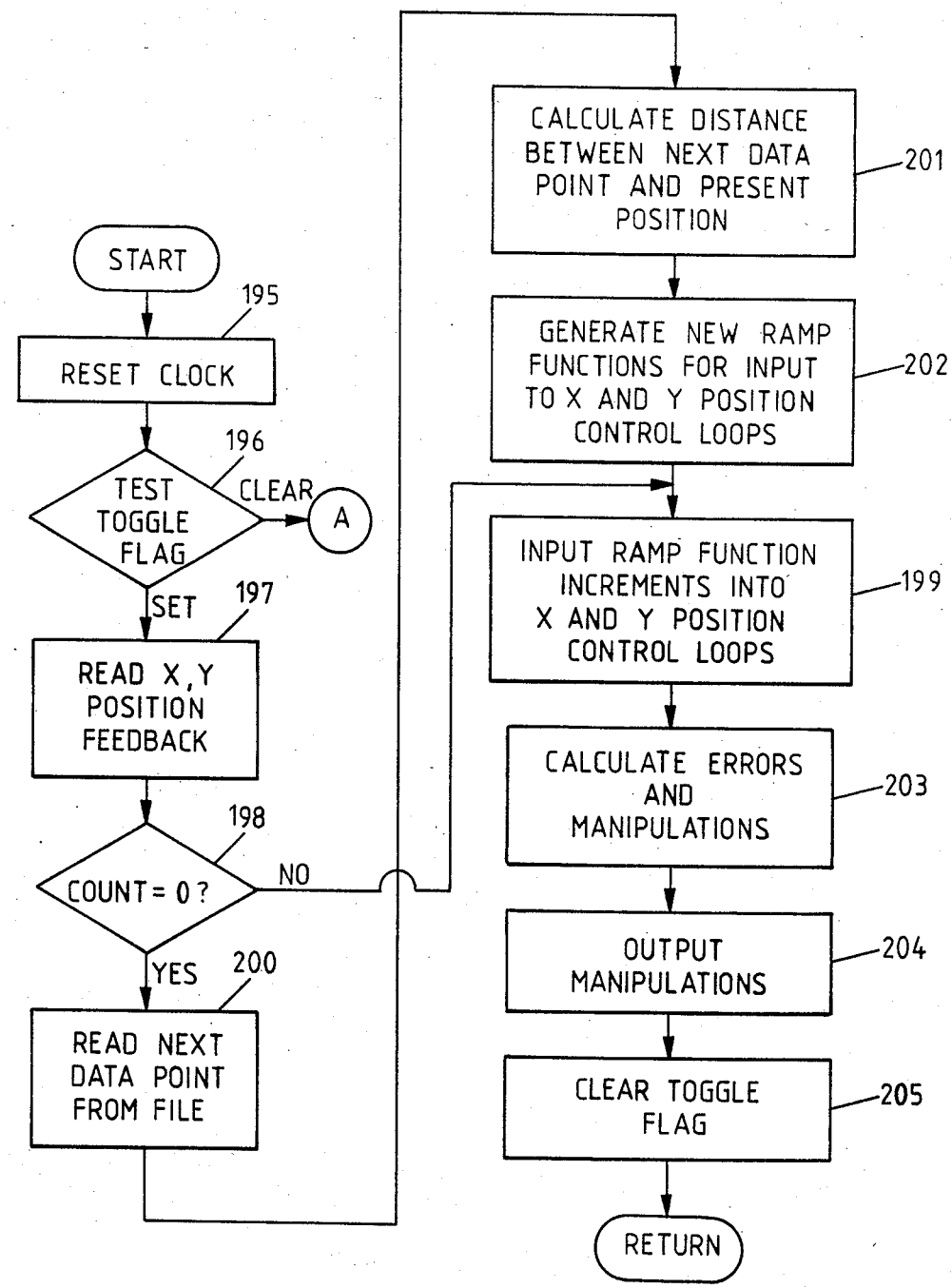
Figure 16:
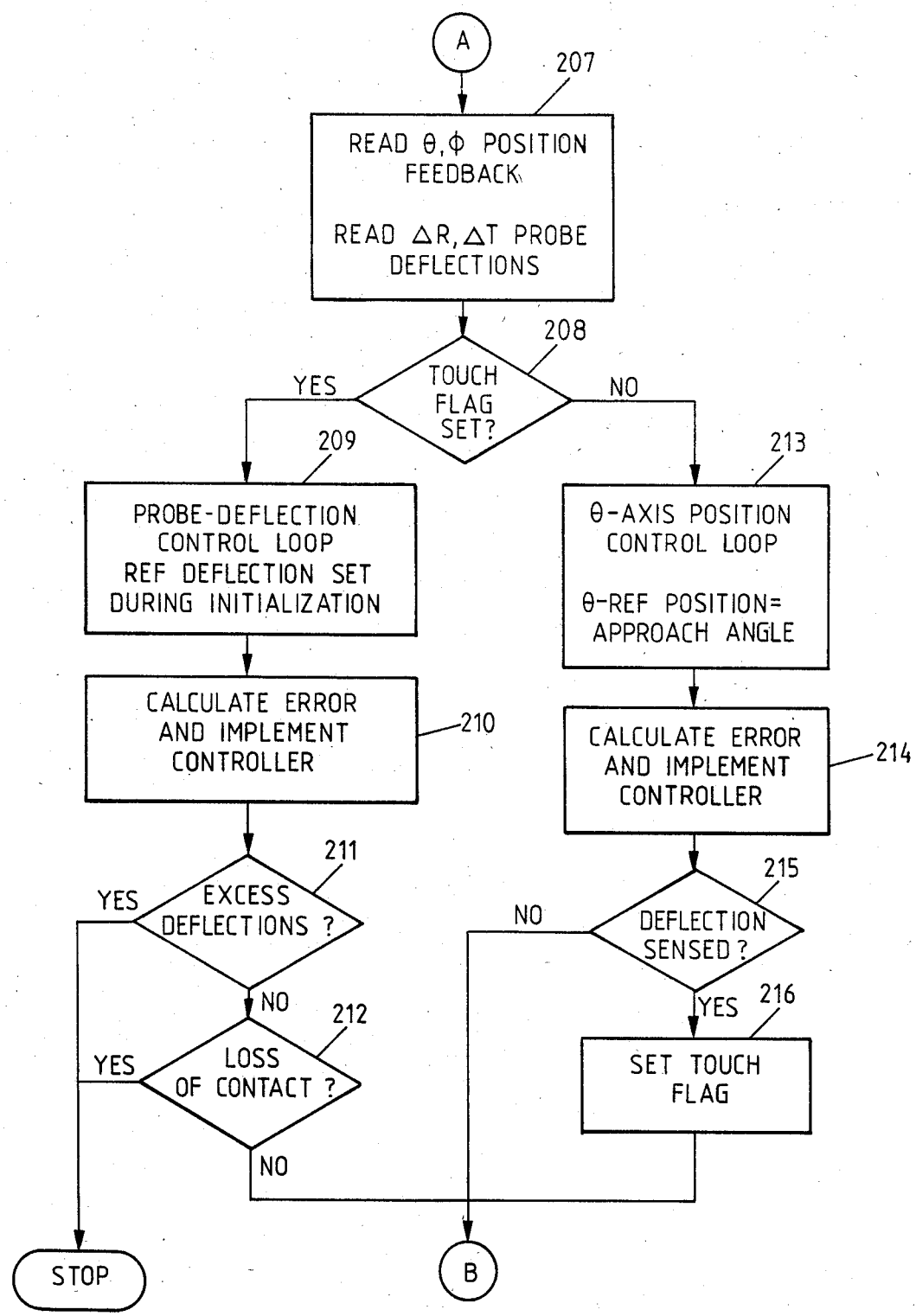
Figure 17:
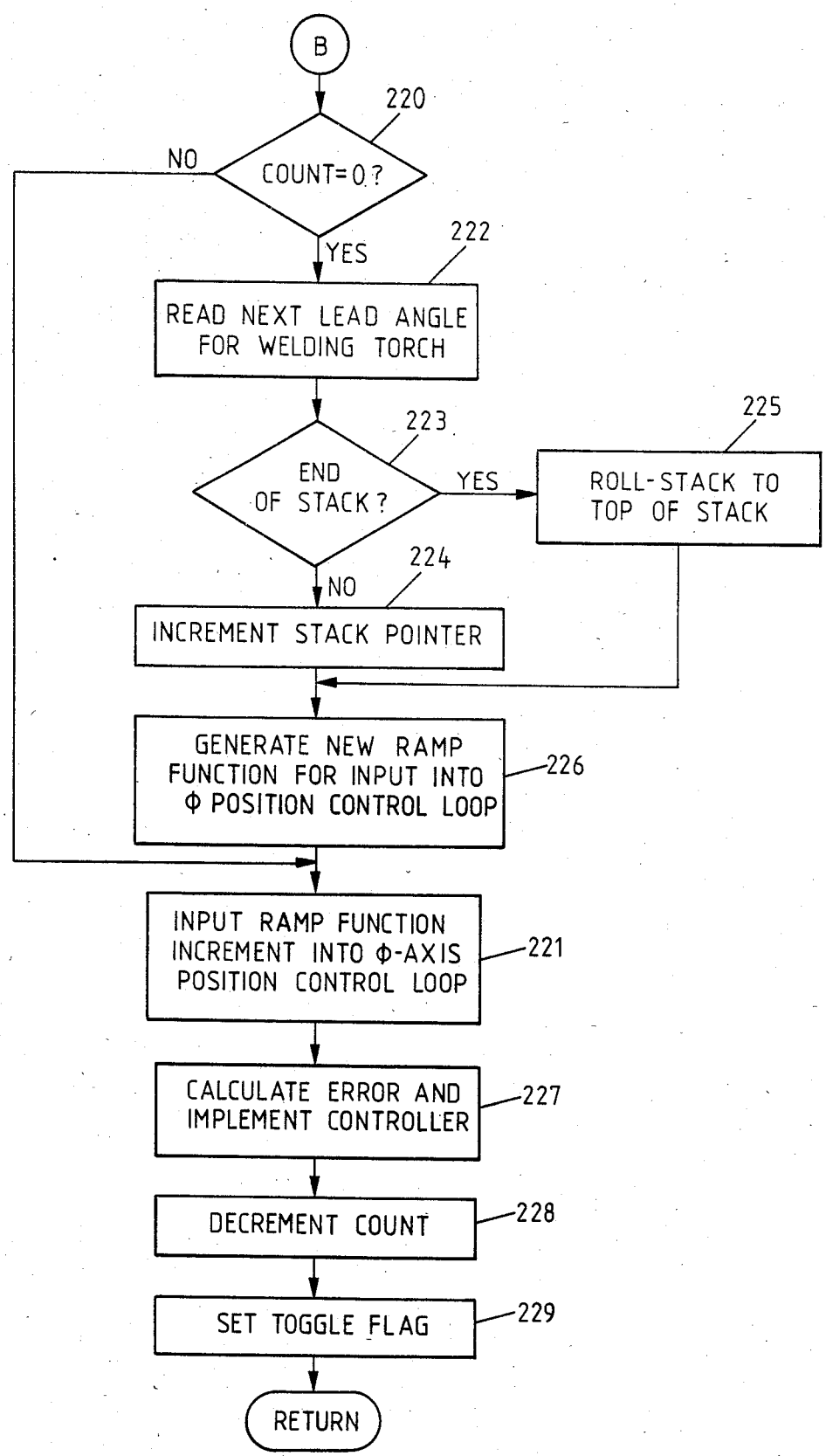

A flow chart of the background program is shown in FIGS. 15, 16, and 17. The background performs the control functions, including generation of motion commands for the guidance of the welding head. After the interrupt, the clock is reset (195), the toggle flag is tested (196), and assuming that it is set, the X and Y position feedback data are read (197). If the count is then not equal to zero (198), the program proceeds to input the ramp function increments into the X and Y position control loops (199). If the count is equal to zero, the next data point is read from the file (200), the distance between the next data point and the present position is calculated (201), and new ramp functions for the inputs to the X and Y position control loops are calculated as described above (202) and these ramp function increments are then inputted into the X and Y position control loops (199). Following this step, the error and manipulation signals are calculated from the X and Y position data and the ramp function inputs previously calculated (203), the manipulation signal is outputted through the digital-to-analog converters to the servo-amplifiers (204) and the toggle flag cleared (205) before the program returns to await the next interrupt.

If the toggle flag tested clear at block 196, the program proceeds as shown in FIG. 16 to read the $\theta$ and $\Phi$ position feedback information and the probe deflections (207). The touch flag is then tested to see if it is set (208); if so, the probe deflection control loop reference deflections are set during initialization (209), the error signals are calculated and the controller is implemented (210) and it is determined whether there are either excess deflections (211) or loss of contact (212); if either, the program immediately stops. If not, the program proceeds. If the touch flag is not set when tested (block 208), the $\theta$ axis position control loop reference position is set to the approach angle (213), the error signal is calculated and the controller is implemented (214) and it is determined whether a deflection is sensed (215); if not, the program immediately proceeds; if so, the touch flag is set (216) before proceeding.

The program proceeds from the steps shown in the flow chart of FIG. 16 to the steps of the flow chart shown in FIG. 17. The count is tested to determine if it is zero (220) and, if not, the ramp function increment is implemented into the $\Phi$ axis position control loop (221). If the count does equal zero, the next lead angle for the welding head is read (222) and the stack is tested to see if it is at its end (223); if not, the stack pointer is incremented (224); if so, the stack is rolled (225) and a new ramp function is generated for input into the $\Phi$ axis control loop (226) before the ramp function is incremented and inputted into the control loop (221). The error signal is then calculated and the controller implemented (227), the count decremented (228), the toggle flag set (229), and the program returned to wait the next interrupt.

Figure 18:
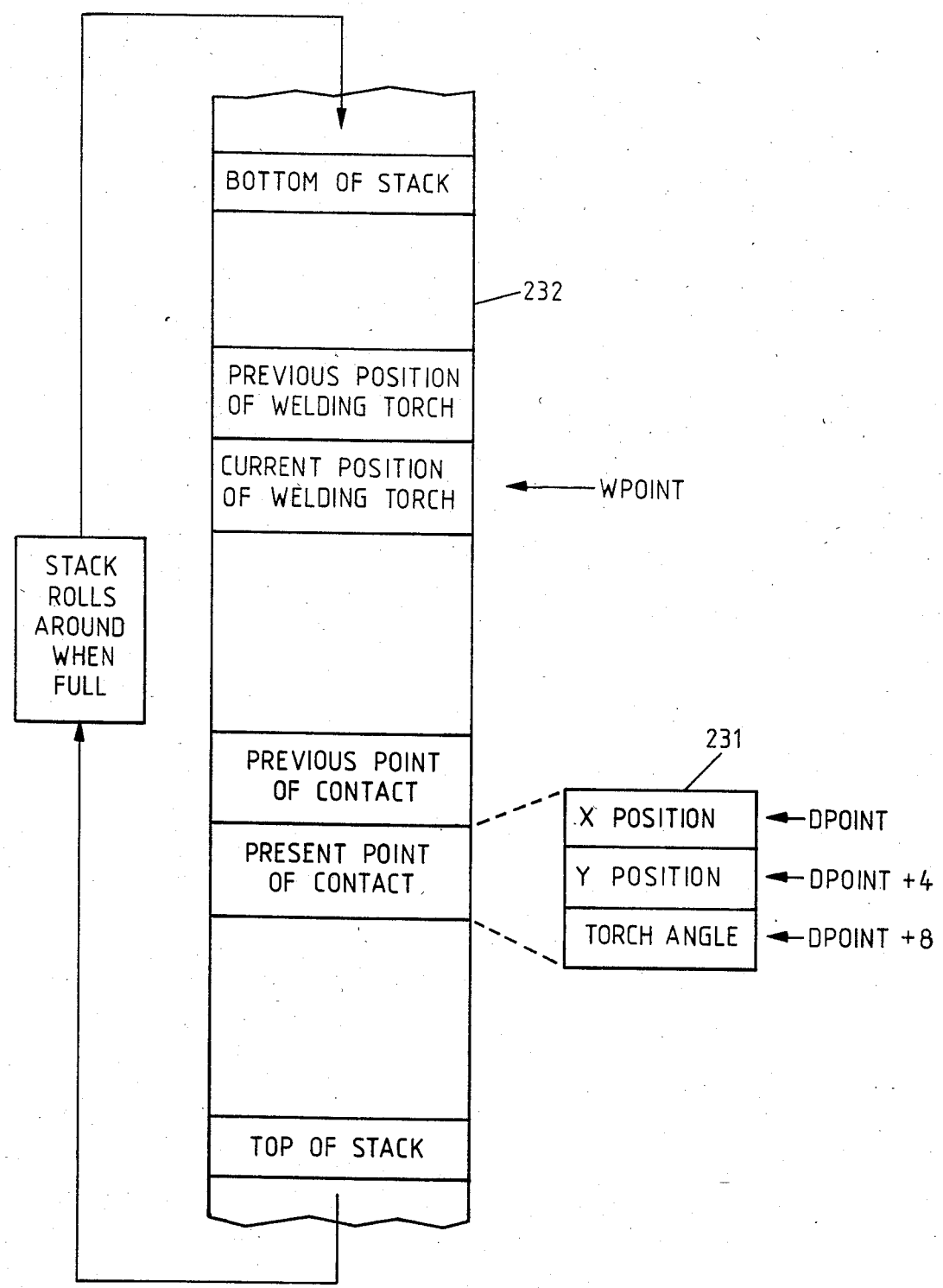
FIG. 18 is a schematic diagram illustrating the operation of the data stack in the computer controller.

The data points that represent the part edge surface are stored in a continuous roll-round data stack. As illustrated in FIG. 18, two stack pointers are employed: DPOINT (231) and WPOINT (232). DPOINT points to the location in the data stack of the next point to be stored. As new points are generated during the tracing of the part surface, these points are consecutively stored in the stack at the location specified by DPOINT, and DPOINT is incremented after each point is stored. WPOINT is used to point to data that is to be retrieved from the data stack for use by the welding head. It points to the next location that the welding head is to reach. After the data has been retrieved and an allotted amount of time is given for the welding torch to reach the specified location represented by the data point. When this time is used up, WPOINT is incremented to point to the next location objective for the welding head. Both stack pointers move from the bottom to the top of the stack. When the top of each stack is reached, it rolls around and starts at the bottom of the stack.

It is understood that the invention is not confined to the particular construction and arrangement herein illustrated and described, but embraces such modified forms thereof as come within the scope of the following claims.

What is claimed is:

1. Apparatus adapted for guiding a work head along an intersection wall on a work piece comprising:
    (a) a work head adapted for performing an operation on a work piece;
    (b) means for supporting the work head relative to the work piece for movement in two dimensions;
    (c) drive means responsive to control signals for driving the work head with respect to the work piece in a direction and at a speed commanded by the control signals;
    (d) means for sensing the position of the work head with respect to the work piece and providing output signals indicative thereof;
    (e) a sensing probe having a tactile sensing tip which is adapted to be deflected by contact with an object, the sensing probe providing an output signal indicative of the magnitude and direction of the deflection of the tip;
    (f) means for mounting the sensing probe for rotational motion about the work head and including drive means responsive to a control signal for selectively rotating the sensing probe about the work head;
    (g) means for sensing the rotational position of the probe with respect to the work head and for providing an output signal indicative thereof;
    (h) control means, receiving the probe deflection signals, the probe rotational position signal and the signals indicating the position of the work head with respect to the work piece, for determining the position of the work head and of the probe and for providing and storing data indicative of the location of the intersection wall in the work piece when the sensing tip is in contact with the intersection wall and for providing control signals to the drive means driving the work head with respect to the work piece and to the drive means for rotating the probe with respect to the work head to move the work head along the location of the intersection wall as determined from data acquired as the probe contacts the intersection wall and for simultaneously moving the probe with respect to the work head to maintain the tactile sensing tip in contact with the intersection wall at a substantially constant deflection of the tip.

2. The apparatus of claim 1 wherein the control means also determines the spatial orientation of a normal to the intersection wall at a series of spaced position data points as the probe moves along the wall with the tactile tip in contact with the wall.

3. The apparatus of claim 2 wherein the work head includes a welding head mounted to a support member for rotation about an axis parallel to the axis about which the probe is mounted for rotation about the work head and wherein the welding head is mounted to the support member at an angle with respect to such axis, and including drive means for rotating the welding head about its axis of rotation in response to a control signal, and wherein the control means provides a control signal to the drive means to rotate the welding head to maintain the same directed toward the intersection wall substantially at a fixed angle with respect to the normal to the wall.

4. The apparatus of claim 2 wherein the control means determines the normal to the intersection wall at a position data point as a vector normal to a line intersecting the position data point and an adjacent position data point.

5. The apparatus of claim 1 wherein the control means provides control signals to the drive means which drive the work head in accordance with the magnitude of error signals indicative of the desired changes in incremental orthogonal positions at each of a series of spaced position data points determined from the sensing probe as it is maintained in contact with the intersection wall.

6. The apparatus of claim 5 wherein the control means controls the work head to move at a substantially constant speed.

7. The apparatus of claim 1 wherein the control means provides control signals to the drive means driving the work head to move the work head along the intersection wall at substantially constant velocity.

8. A welding machine comprising:
  (a) a main support member having a central opening;
  (b) a welding head mounted to the main support member within its central opening for rotation about an axis;
  (c) means for selectively driving the welding head about its axis of rotation;
  (d) means for sensing the rotational position of the welding head with respect to the main support member and providing an output signal indicative thereof;
  (e) a link arm mounted to the main support member for rotation independent of the welding head about an axis parallel to the axis of rotation of the welding head and extending outwardly from the main support member and carrying a sensor on the end thereof which is capable of sensing a seam on a work piece to be welded;
  (f) means for selectively driving the link arm about its axis of rotation with respect to the main support member;
  (g) means for sensing the rotational position of the link member with respect to the main support member and providing an output signal indicative thereof; and
  (h) means for sensing the angular velocity of the welding head about its axis of rotation with respect to the main support member and providing an output signal indicative thereof, and means for sensing the angular velocity of the link member with respect to the main support member and providing an output signal indicative thereof.

9. The welding machine of claim 8 including means for supporting the main support member for motion in two orthogonal directions mutually perpendicular to the axis of rotation of the welding head, and including means for driving the main support member in a selected direction within its range of permitted motion in response to control signals.

10. The welding machine of claim 9 including means for supporting the main support member for motion in a third direction parallel to the axis of rotation of the welding head and including means for selectively driving the main support member in its third direction of motion in response to a control signal.

11. Apparatus adapted for guiding a work head along an intersection wall on a work piece comprising:
  (a) a work head adapted for performing an operation on a work piece;
  (b) means for supporting the work head relative to the work piece for movement in two dimensions relative to X and Y axes fixed at a selected origin;
  (c) drive means responsive to control signals for driving the work head with respect to the work piece in a direction and at a speed commanded by the control signals;
  (d) means for sensing the position of the work head with respect to the work piece and providing output signals indicative thereof;
  (e) a sensing probe having a tactile sensing ball tip which is adapted to be deflected by contact with an object, the sensing probe providing an output signal indicative of the magnitude and direction of the deflection of the tip;
  (f) means for mounting the sensing probe for rotational motion about the work head and including drive means responsive to a control signal for selectively rotating the sensing probe about the work head;
  (g) means for sensing the rotational position of the probe with respect to the work head and for providing an output signal indicative thereof;
  (h) control means, receiving the probe deflection signals, the probe rotational position signal and the signals indicating the position of the work head with respect to the work piece, for determining the position of the work head and of the probe and for providing and storing data indicative of the location of the intersection wall in the work piece when the sensing tip is in contact with the intersection wall and for providing control signals to the drive means driving the work head with respect to the work piece and to the drive means for rotating the probe with respect to the work head to move the work head along the location of the intersection wall as determined from data acquired as the probe contacts the intersection wall and for simultaneously moving the probe with respect to the work head to maintain the tactile sensing tip in contact with the intersection wall at a substantially constant deflection of the tip, wherein the control means also determines the spatial orientation of a normal to the intersection wall at a series of spaced position data points as the probe moves along the wall with the tactile tip in contact with the wall, and wherein the data indicative of the location of the intersection wall at the point of contact with the sensing tip is determined from the following equations:

$$M_x = W_x + L \cos \theta + \Delta T \sin \theta - \Delta R \cos \theta \mp r_b \cos \psi$$

$$M_y = W_y + L \sin \theta - \Delta T \cos \theta - \Delta R \sin \theta \pm r_b \sin \psi$$

where: $M_x$ is the X coordinate of the point of contact; $M_y$ is the Y coordinate of the point of contact; $W_x$ is the X coordinate of the work head; $W_y$ is the Y coordinate of the work head; $\Delta R$ is the deflection of the probe tip in the radial direction; $\Delta T$ is the deflection of the probe tip in the tangential direction normal to a line between the probe and the work head; $\theta$ is the angle of the line between the probe and the work head with respect to the origin; $\psi$ is the angle of the normal vector to the intersection wall surface at the point of contact with respect to the X-axis; $r_b$ is the radius of the probe ball tip; and L is the length between the work head axis and the probe axis, the upper sign in the equations above being used for counterclockwise tracing of the probe and work head about the work piece and the lower sign in the equations above being used for clockwise tracing.

12. The apparatus of claim 11 wherein the work head includes a welding head mounted to a support member for rotation about an axis parallel to the axis about which the probe is mounted for rotation about the work head, and wherein the welding head is mounted to the support member at an angle with respect to such axis, and including drive means for rotating the welding head about its axis of rotation in response to a control signal, and wherein the control means provides a control signal to the drive means to rotate the welding head to maintain the same directed toward the intersection wall substantially at a fixed angle with respect to the normal to the wall.

13. The apparatus of claim 11 wherein the control means determines the normal to the intersection wall at a position data point as a vector normal to a line intersecting the position data point and an adjacent position data point.

14. The apparatus of claim 11 wherein the control means provides control signals to the drive means which drive the work head in accordance with the magnitude of error signals indicative of the desired changes in incremental orthogonal positions at each of a series of spaced position data points determined from the sensing probe as it is maintained in contact with the intersection wall.

15. The apparatus of claim 14 wherein the control means controls the work head to move at a substantially constant speed.

16. The apparatus of claim 11 wherein the control means provides control signals to the drive means driving the work head to move the work head along the intersection wall at substantially constant velocity.

17. Apparatus adapted for guiding a work head along an intersection wall on a work piece comprising:
    (a) a work head adapted for performing an operation on a work piece;
    (b) means for supporting the work head relative to the work piece for movement in two dimensions;
    (c) drive means responsive to control signals for driving the work head with respect to the work piece in a direction and at a speed commanded by the control signals;
    (d) means for sensing the position of the work head with respect to the work piece and providing output signals indicative thereof;
    (e) a sensing probe having a tactile sensing tip which is adapted to be deflected by contact with an object, the sensing probe providing an output signal indicative of the magnitude and direction of the deflection of the tip;
    (f) means for mounting the sensing probe for rotational motion about the work head and including drive means responsive to a control signal for selectively rotating the sensing probe about the work head;
    (g) means for sensing the rotational position of the probe with respect to the work head and for providing an output signal indicative thereof;
    (h) control means, receiving the probe deflection signals, the probe rotational position signal and the signals indicating the position of the work head with respect to the work piece, for determining the position of the work head and of the probe and for providing and storing data indicative of the location of the intersection wall in the work piece when the sensing tip is in contact with the intersection wall and for providing control signals to the drive means driving the work head with respect to the work piece and to the drive means for rotating the probe with respect to the work head to move the work head along the location of the intersection wall as determined from data acquired as the probe contacts the intersection wall and for simultaneously moving the probe with respect to the work head to maintain the tactile sensing tip in contact with the intersection wall at a substantially constant deflection of the tip, and wherein the work head is controlled to move such that, with the work head located at an initial position in the X and Y plane, the control means calculates a change of position reference to be followed by the work head which is determined by the difference between the present position of the work head and the next adjacent position data point as determined from the data indicative of the location of the intersection wall.

18. The apparatus of claim 17 wherein the work head is controlled discretely such that, where $X_n$ and $Y_n$ represent the present position of the work head and the next target data point is represented by the point with coordinates $X_{n+1}$ and $Y_{n+1}$, the X and Y axes discrete changes of position references $\Delta R_x(nT)$ and $\Delta R_y(nT)$ are determined as:

$$\Delta R_x(nT) = \frac{(X_{n+1} - X_n)T}{t_p}$$

$$\Delta R_y(nT) = \frac{(Y_{n+1} - Y_n)T}{t_p}$$

with $t_p = D_p/V_w$, T is the sample period and where $V_w$ is a selected velocity of the work head and $D_p$ is the distance between the present and desired positions and is determined from the expression:

$$D_p = \sqrt{(X_{n+1} - X_n)^2 + (Y_{n+1} - Y_n)^2} .$$

19. The apparatus of claim 17 wherein the control means also determines the spatial orientation of a normal to the intersection wall at a series of spaced position data points as the probe moves along the wall with the tactile tip in contact with the wall.

20. The apparatus of claim 19 wherein the work head includes a welding head mounted to a support member for rotation about an axis parallel to the axis about which the probe is mounted for rotation about the work head and wherein the welding head is mounted to the support member at an angle with respect to such axis, and including drive means for rotating the welding head about its axis of rotation in response to a control signal, and wherein the control means provides a control signal to the drive means to rotate the welding head to maintain the same directed towasrd the intersection wall substantially at a fixed angle with respect to the normal to the wall.

21. The apparatus of claim 19 wherein the control means determines the normal to the intersection wall at a position data point as a vector normal to a line intersecting the position data point and an adjacent position data point.

* * * * *